Nov. 12, 1935.                J. S. STULL                2,020,482
                            DRIVING MECHANISM
                Original Filed Oct. 18, 1930    2 Sheets-Sheet 1
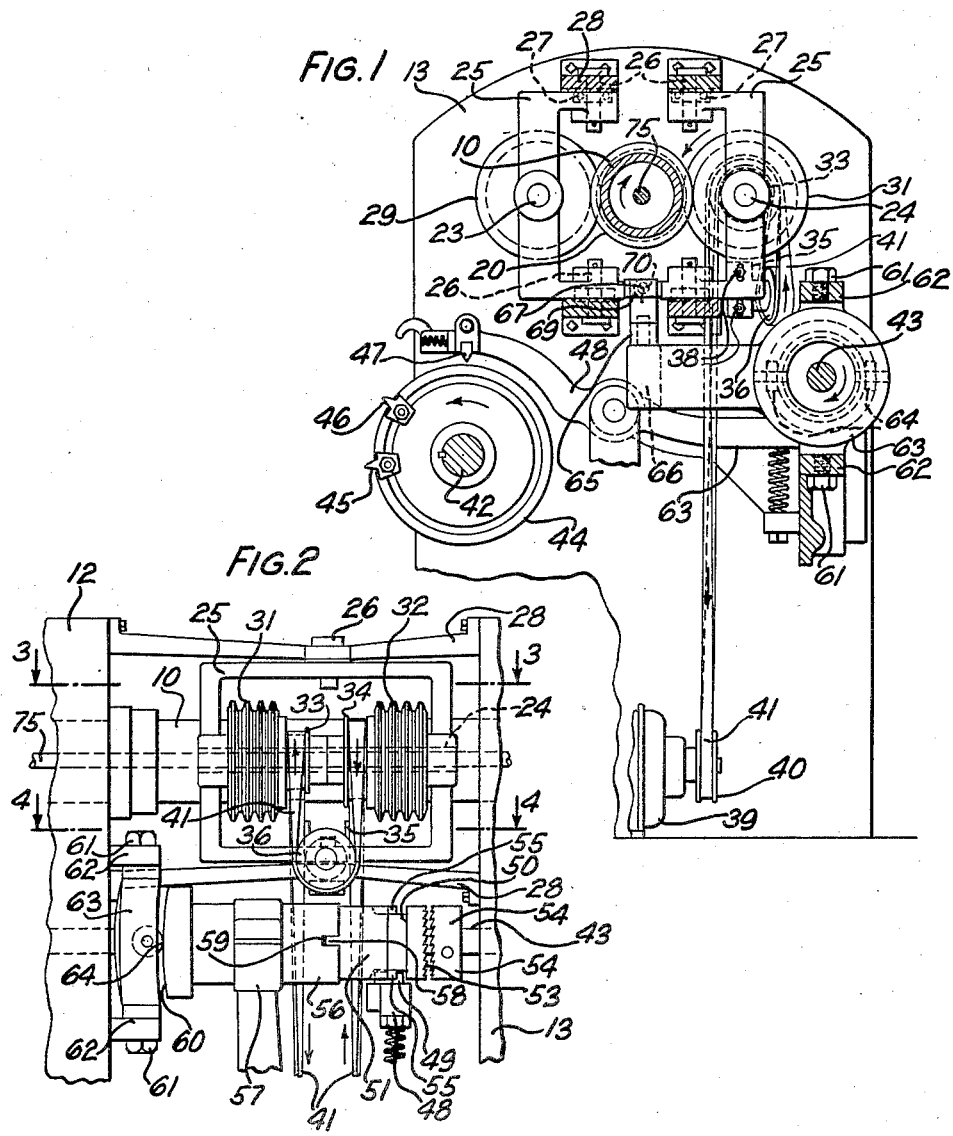
INVENTOR
J. S. STULL
BY H. Q. Whitehorn
ATTORNEY

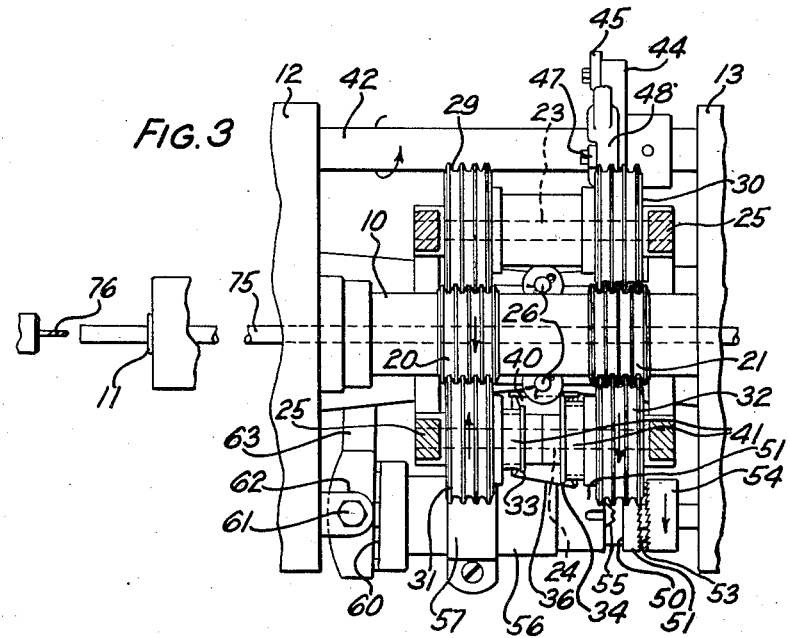

Patented Nov. 12, 1935

2,020,482

UNITED STATES PATENT OFFICE 2,020,482

DRIVING MECHANISM

John S. Stull, Chicago, Ill., assignor to Western Electric Company, Incorporated, New York, N. Y., a corporation of New York Original application October 18, 1930, Serial No. 489,509. Divided and this application December 7, 1933, Serial No. 701,249

8 Claims. (Cl. 74—202)

This invention relates to driving mechanisms, and more particularly to a friction driving mechanism for article working apparatus, and is a division of my copending application, Serial No. 489,509, filed October 18, 1930 now Patent No. 1,943,097.

The primary object of this invention is to provide a simple, efficient, and practical driving mechanism whereby a driven element may be rotated by a laterally disposed driving element without deleterious lateral deflection of the driven element.

In accordance with one embodiment of this invention as applied to a work spindle of an automatic screw machine there is provided a driving mechanism comprising two sets of grooved friction wheels rockably mounted at opposite sides of the spindle to alternately engage similar wheels on the spindle. One set of wheels serves to drive the spindle wheels, while the opposite set functions as idlers to prevent deflection of the spindle, due to the force applied laterally by the other wheels when in driving relation. The driving wheels are rotated in opposite directions at different speeds and manipulation of the wheels at each side of the spindle simultaneously so that only one of the driving and idler wheels of each set will be in driving and supporting relation at a time with the corresponding wheel on the spindle to drive the latter in one direction at a certain speed is effected by a yoke mechanism which moves the sets of wheels in timed relation with respect to each other.

Other objects and advantages of this invention will more fully appear from the following detailed description taken in connection with the accompanying drawings, wherein Fig. 1 is a fragmentary vertical section through a single spindle automatic screw machine showing the spindle driving mechanism of this invention applied to the work carrying spindle thereof;

Fig. 2 is a fragmentary side view of Fig. 1 looking at the right side thereof, and Figs. 3 and 4 are plan sections taken on the lines 3—3 and 4—4 respectively of Fig. 2.

In the drawings, one embodiment of the improved driving mechanism of this invention is shown applied to the driving of a work carrying spindle of an automatic screw machine of the type illustrated and described in the hereinbefore referred to copending application.

Referring now to the drawings in detail, particularly Fig. 3, the nueral 10 indicates a hollow rotary spindle which is equipped with a stock holding chuck 11 at a point forward of a vertical column 12. To the right of the column 12 (Figs. 2 and 3) is a second vertical column 13 similar to the column 12 in which is journaled the spindle 10 extending between the two columns. Formed upon the spindle 10 between the columns 12 and 13 are two spaced multiple grooved friction drive wheels 20 and 21. At diametrically opposite points of the spindle 10 are shafts 23 and 24 parallely alined in a horizontal plane with the spindle 10 and fixed to yoke members 25 pivoted as indicated in Figs. 1 and 2 to rock about spaced vertical axes 26. The yoke members 25 are supported in ball bearings 27 at their axes 26 (dotted outline Fig. 1), the bearings being mounted in bracket arms 28 spanning the columns 12 and 13 and fixed thereto. Rotatably free upon the shaft 23 are two integral multiple grooved friction idler wheels 29 and 30 substantially similar to the wheels 20 and 21 upon the spindle 10, only considerably larger in diameter, and operatively aligned respectively therewith. Mounted to freely rotate upon the shaft 24 are two driving wheels 31 and 32 similar to the wheels 29 and 30 and operatively aligned with the wheels 20 and 21, respectively, the wheels 31 and 32 being rotatable independently of each other. The idler wheels 29 and 30, which are arranged diametrically opposite the driving wheels 31 and 32, it will be apparent, serve to resist the lateral thrust of the latter wheels upon the wheels 20 and 21 on the spindle 10.

This arrangement provides for a balanced pressure from opposite sides upon the spindle 10 and eliminates deleterious lateral deflection thereof, with the result that the spindle may be run at a very great rate of speed with a minimum tendency to heat, and with a minimum of deflection of the spindle a more accurate forming of the articles to be produced is effected. Upon their adjacent inner ends the wheels 31 and 32 are formed with belt pulleys 33 and 34, respectively, the pulley 34 being the larger diameter pulley for a purpose which will be described hereinafter.

Adjustably mounted for vertical movement upon the yoke member 25, intermediate the pulleys 33 and 34 and below the same, is a bracket 35 (Figs. 1 and 4) having journaled thereon an idler belt pulley 36. The bracket 35 is guided when adjusted upon the yoke member 25 by cooperating tongues and grooves 37 formed upon the bracket and the yoke member, and when positioned is clamped to the yoke member by bolts 38 extending through slots in the yoke member and threaded into the tongues 37 of the bracket 35. Mounted on the base of the machine frame is a motor 39 with a belt pulley 40 fixed to the shaft thereof. An endless belt 41 is looped around the motor pulley 40, the pulleys 34, 36 and 33 and back to the motor pulley 40. By adjusting the bracket 35 it will be apparent that the tension on the belt 41 may be readily changed. The motor 39 is continuously operated, the pulley 40 being rotated in a counterclockwise direction, as viewed in Fig. 1 when looking at the right end of the pulley, and consequently the belt 41, as indicated by the direction of the arrows in Figs. 1 and 2, will drive the pulleys 33 and 34 in counterclockwise and clockwise directions, respectively, and thereby the friction drive wheels 31 and 32 in corresponding directions.

Cam and main drive shafts 42 and 43, respectively, of the automatic screw machine, extend between the columns 12 and 13, the cam shaft 42 having fixed thereon a cam carrier 44, which supports two circumferentially adjustable cams 45 and 46. During each counterclockwise rotation of the shaft 42 the cams 45 and 46 engage at predetermined intervals a cam 47 pivotally carried upon the end of a clutch tripping lever 48. Mounted in the opposite end of the lever 48 is a pin 49 engaged in a peripheral cam groove 50 (Figs. 2 and 4) formed on a driven clutch member 51 rotatably free and slidable upon the shaft 43 and as the cams 45 and 46 move past the cam 47 of the tripping lever 48, the driven clutch member is released and caused to immediately slide upon the shaft 43 by a compression spring 52, dotted outline Fig. 4, surrounding the shaft 43 within the driven clutch member 51. When the driven clutch member 51 is released, cooperating clutch teeth 53 on the driven clutch member and a driving clutch member 54 fixed to the shaft 43 are engaged, the clutch members 51 and 54 being automatically disengaged after each one-half revolution of the driven clutch member 51 by means of two diametrically opposed cam projections 55 (Figs. 2 and 4) provided in the cam groove 50 which successively move into engagement with the pin 49 and retract the driven clutch member from engagement with the driving clutch member until one of the cams upon the carrier 44 again trips the clutch tripping lever 48.

A shouldered sleeve 56 is mounted to freely rotate upon the shaft 43 at the left end of the driven clutch member 51, a split bearing 57 in which the sleeve 56 surrounding the shaft 43 is journaled fitting between enlarged ends of the sleeve prevents longitudinal movement thereof. A cooperating tongue 58 and a slot 59 (Fig. 2) upon the adjacent ends of the slidable driven clutch member 51 and the sleeve 56, respectively, which are in operative engagement at all times, permits rotary motion to be transmitted to the sleeve whenever the clutch members 51 and 54 are engaged. The sleeve member 56 at its left end is provided with a cam face 60. Pivoted vertically, as indicated at 61 (Fig. 4), between lugs 62 upon the column 12 is a lever 63 carrying a pair of rollers 64 which ride upon the cam face 60. Referring particularly to Figs. 1 and 4, one end of the lever 63 is pivoted to a link 65 extending between and centered with the opposed pivotal yoke members 25 and having a bearing upon an arm 66 integral with the lever 63. The inner end of the link 65 is provided with a vertical arm 67 which extends upwardly through an elongated slot 68 (Fig. 4) in a wedge plate 69 supported freely upon the upper surface of the link 65. Mounted in depressions in the wedge plate 69 at opposite ends of the slot 68 are compression springs 70 engaging at their inner ends opposite sides of the arm 67 of the link 65. The springs 70, it will be apparent, provide means to compensate for wear on the cooperating parts. At each end of the wedge plate 69 the vertical sides thereof are tapered inwardly for a distance to provide camming surfaces, as indicated at 71 and 72. The opposed vertical sides of the yoke members 25 adjacent each end thereof are formed with camming surfaces 73 and 74 which are parallel to and aligned with the camming surfaces 71 and 72, respectively.

In the operation of the referred to screw machine, to the work carrying spindle 10 of which, for example, the driving mechanism of this invention has been applied, articles are produced from rod stock 75 which is fed forward at predetermined intervals in the operation of the machine through the hollow spindle 10 and then gripped by the chuck 11 (Fig. 3). In the production of an article from the stock 75 in which, for example, a right hand thread is to be cut in a cylindrical inner wall of an aperture formed by forming tools of the screw machine, one of which is shown at 76 (Fig. 3), it will be apparent that the stock 75 should be rotated counterclockwise and at a suitable speed. During centering, drilling, boxing, forming, threading off, and cut-off operations on the stock 75 to produce an article it is rotated in a clockwise direction at a high speed compared to the speed at which the threading operation should be performed. Therefore, it is necessary upon completion of the forming operation to reduce the speed of rotation of the stock rotating spindle 10 and also to reverse its direction of movement from clockwise to counterclockwise before a threading tool engages the stock 75 and immediately upon completion of the threading operation to again reverse its direction of rotation and increase the speed thereof to its former speed as the tool is threaded out of the threaded aperture in the stock 75.

At a predetermined period in the counterclockwise rotation of the cam shaft 42 or upon completion of the forming operation the cam 45 upon the carrier 44 engages the cam 47 upon the tripping lever 48 and the driven clutch member 51 is released and in the manner hereinbefore described causes the cam face 60 to rotate with the shaft 43. Upon the driven clutch member 51 rotating one-half of a revolution with the driving clutch member 54 it is disengaged from the latter in the manner hereinbefore described. The motion of the cam face 60 during this one-half revolution of the clutch member 51 serves to rock the lever 63 in a counterclockwise direction (Fig. 4) about its pivot 61, thus drawing the link 65 towards the left and by means of the vertical arm 67 thereof yieldably connected to the wedge plate 69 by the cooperating springs 70, the wedge plate is moved to the left (Fig. 4). This movement of the wedge plate 69 disengages the camming surfaces 72 at the right end thereof from the camming surfaces 74 of the yoke members 25 and in the engagement of the camming surfaces 71 at the left end of the plate 69 with the camming surfaces 73 of the yoke members 25 the latter are simultaneously rocked in opposite directions about their pivots 26. As a result of this movement of the yoke members 25 the friction wheels 29 and 31 are rocked out of engagement with the friction wheel 20 on the work spindle 10 and simultaneously therewith the wheels 30 and 32 are moved into engagement with the wheel 21 on the spindle 10. Since the driving wheel 32 is rotating clockwise the driven wheel 21 on the spindle 10 will be rotated counterclockwise, the desired direction of rotation of the stock 75 during the threading operation and with the larger diameter driving pulley 34 fixed to the wheel 32, the speed of rotation of the spindle 10 will also be reduced to a suitable speed for the threading operation.

Thereafter in the continued rotation of the cam shaft 42 and upon completion of the threading operating the cam 46, in the manner hereinbefore described in connection with the cam 45, releases the driven clutch member 51, which again is rotated one-half revolution, during which period the yoke members 25 are rocked about their pivots 26 by the movement of the wedge plate 69 towards the right to the position shown in Fig. 4. The friction wheels 30 and 32 are thus disengaged from the wheel 21 on the spindle 10, and the wheels 29 and 31 are moved into engagement with the wheel 20 of the spindle, which causes the latter and stock 75 carried thereby to be again rotated clockwise and at a relatively higher speed than during the threading operation in preparation for the threading off operation which immediately follows.

It is believed from the foregoing description of the improved friction driving mechanism of this invention as applied to the driving of the work carrying spindle 10 of the referred to automatic screw machine that the manner of its operation to effect a predetermined intermittent driving of the work carrying spindle 10 in opposite directions at different speeds and supporting the same from deflection will be clearly apparent.

From the foregoing description it will be understood that by providing driving and idler wheels larger than the cooperating wheel on the driven spindle and moving the driving wheels and its associated idler wheel simultaneously into engagement with the intermediate driven wheel on the spindle no pressure will be exerted on the work carrying spindle except a balanced pressure in opposite directions at diametrically opposite points of the spindle. Thus deleterious lateral deflection of the spindle is eliminated and consequently the spindle may be rotated at a very great rate of speed with a minimum tendency of overheating the bearings which results in reducing maintenance of the mechanism. Furthermore, with the elimination of deleterious lateral deflection of the driven element or work carrying spindle in the present application of the features of this invention a more accurate forming of the articles to be produced is effected.

It is to be understood that the embodiment of the invention herein described and illustrated is merely a convenient and useful form of the invention and is not limited to the referred to specific application thereof, but is capable of numerous other applications and modifications within the scope of the appended claims.

What is claimed is:

1. In a friction driving mechanism, a driven member, a drive for said member, including a pair of aligned driven friction wheels connected to said member, a pair of aligned friction driving wheels operatively engageable with said driven wheels at one side thereof, a pair of aligned idler friction wheels engageable with said driven wheels at a point diametrically opposite said driving wheels for balancing the lateral thrust of said driving wheels upon said driven wheels, means for pivotally supporting each of said pairs of driving and idler wheels as a unit for movement to alternately engage and disengage the wheels of each pair with the corresponding driven wheels, means operatively associated with said pivotal supporting means for simultaneously moving the pairs of wheels to engage one driving and idler wheel with opposite sides of the corresponding driven wheel and thereby disengaging the other driving and idler wheels from the other driven wheel, and means for rotating the driving wheels in opposite directions at different speeds.

2. In a friction driving mechanism, a driven member carrying a pair of driven friction wheels, pairs of rotary driving and idler friction wheels movably supported and arranged in aligned pairs respectively at opposite sides of the driven wheels for lateral movement to and from the same for alternately engaging and disengaging the same, the idler wheels effective to resist the lateral thrust of the driving wheels upon the driven wheels, means for moving the pairs of driving and idler wheels to engage one wheel of each pair with opposite sides of the aligned driven wheel and simultaneously therewith disengaging the companion driving and idler wheel from the other aligned driven wheel, and means for rotating the driving wheels in opposite directions.

3. In a friction driving mechanism, a driven member carrying a pair of driven friction wheels, pairs of rotary driving and idler friction wheels arranged in aligned pairs respectively at opposite sides of the driven wheels, pivotal brackets upon which the pairs of rotating driving and idler friction wheels are journaled for lateral movement to and from the driven wheels for alternately engaging and disengaging the same, the idler wheels effective to resist the lateral thrust of the driving wheels upon the driven wheels, a reciprocable cam member for alternately engaging oppositely arranged cam surfaces upon the pivotal brackets for rocking the pairs of driving and idler wheels carried on the brackets to engage one wheel of each pair with opposite sides of the aligned driven wheel and simultaneously therewith disengaging the companion driving and idler wheels from the other aligned driven wheel, and means for rotating the driving wheels in opposite directions at different speeds.

4. In a friction driving mechanism, a driven member, a drive for said member including a pair of aligned driven friction wheels connected to said member, a pair of aligned friction driving wheels operatively engageable with said driven wheels at one side thereof, a pair of aligned idler friction wheels engageable with said driven wheels at points diametrically opposite said driving wheels, and means for pivotally supporting each of said pairs of driving and idler wheels as a unit for movement to alternately engage one of the wheels and disengage the other of said wheels of each pair with the corresponding driven wheels, the axis of said supporting means being angularly disposed with respect to the axis of said driven wheels.

5. In a friction driving mechanism, a driven member, a drive for said member including a pair of aligned driven friction wheels connected to said member, a pair of aligned friction driving wheels operatively engageable with said driven wheels at one side thereof, a pair of aligned idler friction wheels engageable with said driven wheels at points diametrically opposite said driving wheels, means for pivotally supporting each of said pairs of driving and idler wheels as a unit for movement to alternately engage one of the wheels and disengage the other of said wheels of each pair with the corresponding driven wheels, and means operatively associated with said pivotal supporting means for simultaneously moving the pairs of wheels to engage one driving and idler wheel with opposite sides of the corresponding driven wheel, and thereby simultaneously disengage the other driving and idler wheels from the other driven wheel.

6. In a friction driving mechanism, a driven member, and means for alternately driving said member at a predetermined speed in one direction and at a different speed in the opposite direction comprising a pair of driven friction wheels connected to said member, a pair of aligned driving friction wheels, a pivotally mounted bracket for rotatably supporting said driving wheels, means for rotating said driving friction wheels at different speeds in opposite direction, and means for rocking said bracket about its pivot for alternately moving said driving friction wheels into operative engagement with their respective driven wheels.

7. In a friction driving mechanism, a driven member, and means for alternately driving said member at a predetermined speed in one direction and at a different speed in the opposite direction comprising a pair of driven friction wheels connected to said member, a pair of aligned driving friction wheels, a pair of idler friction wheels, pivotally mounted brackets for rotatably supporting said driving and said idler friction wheels, means for rotating said driving friction wheels at different speeds in opposite directions, and means for rocking said brackets simultaneously about their pivots for alternately moving said driving friction wheels and their corresponding idler friction wheels into operative engagement with their respective driven wheels.

8. In a friction driving mechanism, a driven member, and means for alternately driving said member in opposite directions comprising a pair of driven friction wheels connected to said member, a pair of aligned driving friction wheels, means for pivotally supporting said pair of driving wheels for movement as a unit about an axis transverse to the axis of rotation of said driven wheels, and means for moving said supporting means to alternately engage one of the driving wheels with its corresponding driven wheel and simultaneously therewith disengaging the other driving wheel from its corresponding driven wheel.

JOHN S. STULL.